No. 813,571. PATENTED FEB. 27, 1906.
J. McDONALD.
TOE OR GROUTER ATTACHMENT FOR TRACTION WHEELS.
APPLICATION FILED OCT. 7, 1905.
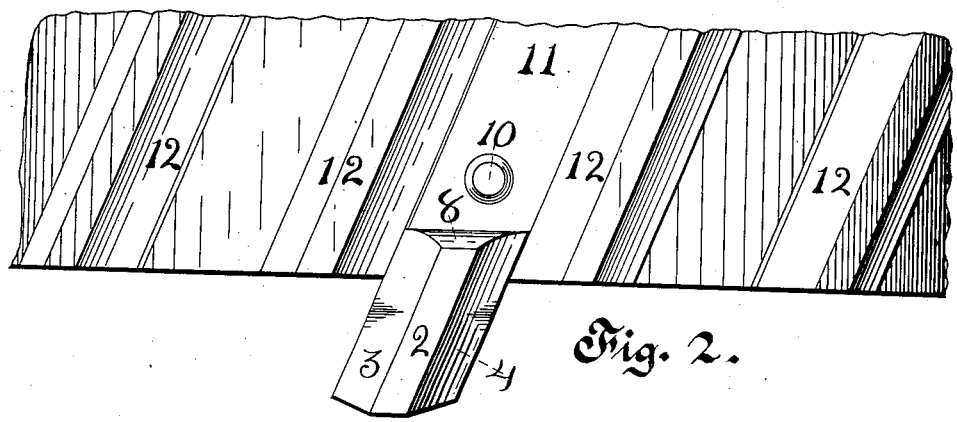
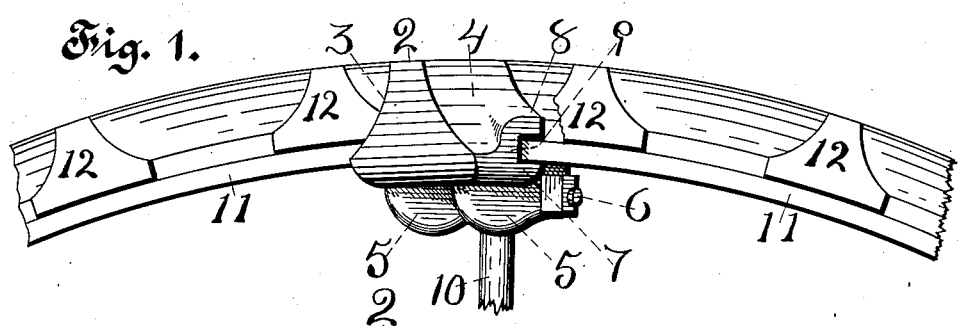
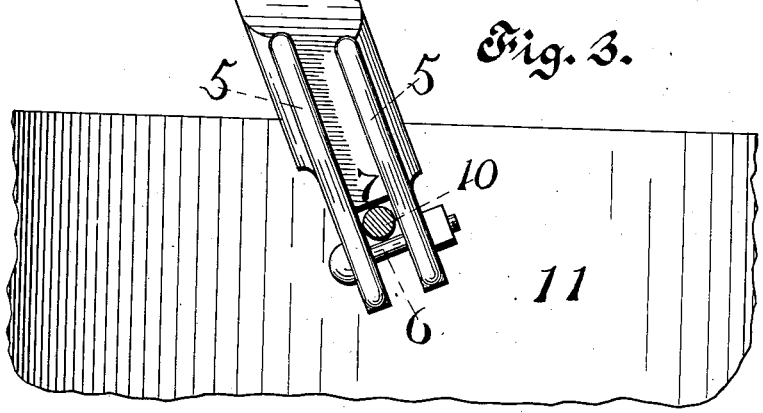
WITNESSES:
Lloyd C. Chambers
Alfred Cambron
John McDonald INVENTOR
BY Jon. Vaughon
his ATTORNEY.

UNITED STATES PATENT OFFICE.

JOHN McDONALD, OF BLAIR TOWNSHIP, WASHINGTON COUNTY, NEBRASKA.

TOE OR GROUTER ATTACHMENT FOR TRACTION-WHEELS.

No. 813,571. Specification of Letters Patent. Patented Feb. 27, 1906.

Application filed October 7, 1905. Serial No. 281,820.

*To all whom it may concern:*

Be it known that I, JOHN McDONALD, a citizen of the United States, residing in Blair township, in the county of Washington and State of Nebraska, have invented a new and useful Mud-Toe or Grouter for the Drive-Wheels of Traction-Engines, of which the following is a specification.

My invention relates to improvements in detachable mud-toes or grouters applied, when occasion requires it, to increase the traction of the drive-wheels of road-engines, to increase the foothold of the traction-wheels of traction-engines on earth roads; and the objects of my improvement are, first, to afford facilities for conveniently and securely attaching the grouter and its easy removal; second, to provide a grouter that will not be destructive to the wooden floors of highway-bridges or the plank cross-walks in cities; third, to avoid the increased accumulation of mud on the tread of the traction-wheel when special grouters are attached, and, fourth, to remove the jolt incident to the use of the ordinary grouter when running over very hard roads or pavements. I attain these objects by the mechanism illustrated in the accompanying drawings, in which—

Figure 1 is a side elevation of a portion of the rim and spoke of a traction-wheel with the grouter attached. Fig. 2 is an outside view of a portion of the periphery of the rim or the tread of the wheel, showing the working face of the grouter as it appears when attached; and Fig. 3 is a view of the same on the inside looking from the hub of the wheel.

Similar numerals refer to similar parts throughout the views.

The treads of the drive-wheels of traction-engines are usually provided with the cleats or lugs 12 to cut into the road and prevent slipping in the direction of the load. They are disposed diagonally across the rim, as shown in Fig. 2, to prevent lateral slipping also. In wet weather or on soft fields the spaces between these lugs 12 become filled with mud, which destroys their effect. To overcome this difficulty, it has heretofore been the custom to attach between these lugs on the rims of the wheels a less number of farther-projecting lugs or grouters, spaced evenly around the wheel. It was necessary to remove these special grouters to cross the ordinary highway-bridge, because projecting out farther concentrated the great weight of the engine at a small bearing, which would crush the planking, as it also did the wooden cross-walks in the cities and towns.

My invention which overcomes these difficulties consists of an integral piece of cast-iron having the fork 9 to engage the lateral edge of the rim 11 of a traction-wheel.

The outer surface or tread of the grouter consists of the plain surface 2, flanked forward and back by the parallel retiring curved surfaces 4 and 3. One end of this tread forms the outer branch 8 of the fork 9. This branch 8 overlaps the outer periphery of the rim at its edge and fills as far as it projects the circumferential space between two lugs 12 and 12. The edges of the inside portion are convergently curved or rounded. One end of this part projects to form the inner branch 7 of the furcation 9. This branch engages the inner periphery of the rim 11.

The inside of the grouter with its inner branch 7 is reinforced by the pair of integral ribs 5 and 5. These ribs are disposed parallel throughout the length of the grouter. They extend beyond the projecting end of the branch 7 to form a fork to engage the spoke 10 of the wheel. Lateral perforations toward the projecting ends of these rib branches carry the bolt 6, which retains the spoke within the fork. This holds the grouter fast to the edge of the rim of the wheel. Where the spoke construction is such that it will not lend itself to this mode of attachment, the rim 11 is drilled and a short thick bolt inserted instead of the spoke.

The tread 2 of this grouter is brought into the same circumferential plane as the treads of the lugs 12. (See Fig. 1.) Therefore the destruction of planking over which they pass is avoided and the jolting consequent to other grouters on hard roads and pavements is eliminated.

The effective or working part of this grouter projects laterally beyond the edge of the rim to the outside of the path of the wheel. In this position, there being usually five grouters to each wheel, each grouter strikes down singly into the undisturbed ground at the side of the path. The curved back surface 4 of each grouter slides into and accumulates its independent fulcrum of earth. Any tendency of the wheel to slip increases the size and density of this fulcrum. This action is most marked on the softer fields, but is quite effective on a muddy road.

The concave surfaces 3 and 4 are of such curvature as to facilitate their scouring, for which reason, in connection with the isolated position of each, these grouters run usually clean.

I claim—

1. A toe or grouter attachment for traction-wheels consisting of a part to project laterally to engage the road at one side of the path of the wheel and having a bifurcate base to engage the adjacent edge of the rim of the wheel and adapted to be rigidly fastened thereto.

2. A toe or grouter for the wheels of traction-engines, having a bifurcated base to engage the edge of the rim of the wheel; and the inner branch of the forked base bifurcated to engage a spoke of the wheel.

3. A detachable toe or grouter to set to one side of the tread of a traction-wheel, and having a bifurcate base to engage the edge of the rim of said traction-wheel, and one branch of said base furcation again bifurcated to engage a spoke or bolt through the said rim.

4. A detachable toe or grouter, for the drive-wheels of traction-engines, having a bifurcation to engage the rim of the wheel, the inner branch of this bifurcation bifurcated to engage a spoke of the wheel, and a bolt disposed through the inner branches against the spoke.

Signed at Blair, in the county of Washington and State of Nebraska, this 3d day of October, 1905.

JOHN McDONALD.

Witnesses:
A. P. HOWES,
F. W. KENNY, Sr.